US006968243B1

(12) United States Patent
Oh

(10) Patent No.: US 6,968,243 B1
(45) Date of Patent: Nov. 22, 2005

(54) COMPETITION JUDGING SYSTEM

(76) Inventor: Je Seon Oh, 8289 Elvaton Rd., Millersville, MD (US) 21108

( * ) Notice: Subject to any disclaimer, the term of this patent is extended or adjusted under 35 U.S.C. 154(b) by 0 days.

(21) Appl. No.: 10/462,537

(22) Filed: Jun. 17, 2003

(51) Int. Cl.$^7$ .......... G06F 155/00
(52) U.S. Cl. .......... 700/91; 463/40
(58) Field of Search .......... 463/40–42, 35; 700/91–92

(56) References Cited

U.S. PATENT DOCUMENTS

| | | | | |
|---|---|---|---|---|
| 6,569,012 | B2 * | 5/2003 | Lydon et al. | 463/9 |
| 2003/0069072 | A1 * | 4/2003 | Miura | 463/42 |
| 2003/0171982 | A1 * | 9/2003 | Paul | 705/12 |
| 2004/0111170 | A1 * | 6/2004 | Hasday | 700/91 |

* cited by examiner

*Primary Examiner*—Kim Nguyen
(74) *Attorney, Agent, or Firm*—Michael I. Kroll

(57) ABSTRACT

A method for judging a musical performance is disclosed by the present invention. The method includes entering competitors on a match play board based upon seeding to determine individual matches for competitors. Each competitor in a match performs an individual act. The act of each performer is then judged based upon a plurality of individual performance criteria to determine criteria scores for each competitor. The total scores for each competitor are then determined based upon the determined criteria scores. A winner of each match based upon which competitor received a highest score and the winner of each match is entered on the match play board into a next round of competition. Preferably the performance for the competition is in the musical field of Hip-Hop music. The plurality of individual performance criteria preferably includes at least one of judging by individual judges, noise level of an audience viewing the performances, call in votes and internet votes.

10 Claims, 8 Drawing Sheets

16 — DECIBEL LEVEL (dB)

| dB | NUMERICAL VALUE |
|---|---|
| 120 dB | = 10 |
| 118 dB | = 9 |
| 116 dB | = 8 |
| 114 dB | = 7 |
| 112 dB | = 6 |
| 110 dB | = 5 |
| 108 dB | = 4 |
| 106 dB | = 3 |
| 104 dB | = 2 |
| 102 dB | = 1 |

15

FIG. 5

COMPETITION JUDGING SYSTEM

BACKGROUND OF THE INVENTION

1. Field of the Invention

The present invention relates generally to judging systems and, more specifically, to a system for judging a competition utilizing various categories each having a pre-determined weight assigned thereto. The categories of the competition judging system are weighted such that a category deemed to have the greatest level of impartiality, such as a panel of independent judges, is weighted the heaviest to ensure a high level of fairness. The competition judging system is preferably used in conjunction with a Hip-Hop competition whereby a plurality of Hip-Hop acts compete with their performances being judged using the judging system of the present invention.

2. Description of the Prior Art

Numerous other competition judging systems are known in the prior art. However, these prior art systems judge live performance competitions between musical acts in a manner which is biased towards specific acts performing. Specifically, if certain musical acts have the most fans in the audience, those musical acts have a distinct advantage. These so called "battle of the bands" systems that exist do not allow fair judging as they only incorporate the use of the fans that are present at the venue where the act is performing or call in tallies for calculating a winning team. While these systems may be suitable for the purposes for which they were designed, they would not be as suitable for the purposes of the present invention, as hereinafter described.

SUMMARY OF THE PRESENT INVENTION

The present invention relates generally to judging systems and, more specifically, to a system for judging a competition utilizing various categories each having a predetermined weight assigned thereto. The categories of the competition judging system are weighted such that a category deemed to have the greatest level of impartiality, such as a panel of independent judges, is weighted the heaviest to ensure a high level of fairness. The competition judging system is preferably used in conjunction with a Hip-Hop competition whereby a plurality of Hip-Hop acts compete with their performances being judged using the judging system of the present invention.

A primary object of the present invention is to provide a competition judging system that overcomes the shortcomings of the prior art systems.

Another object of the present invention is to provide a competition judging system that ensures that the winner of a match is determined in an unbiased manner.

An even further object of the present invention is to provide a competition judging system useing a plurality of categories to determine the winner of a match.

Still another object of the present invention is to provide competition judging system wherein each of the categories used to determine the winner of the match is assigned a predetermined weight.

Yet another object of the present invention is to provide competition judging system wherein the category having the highest weight assigned thereto is the most unbiased category.

Yet another object of the present invention is to provide competition judging system wherein the scores in the highest weighted category are determined by a plurality of judges.

Still yet another object of the present invention is to provide competition judging system wherein each of the plurality of judges rates each performer using a plurality of predetermined categories.

A further object of the present invention is to provide a competition judging system wherein one of the categories used in determining a winner is a decibel level of audience applause.

An even further object of the present invention is to provide a competition judging system that utilizes a decibel meter to determine the level of the sound produced by the audience after a performer has completed a performance.

Still an even further object of the present invention is to provide a competition judging system that converts a reading on a decibel meter into a numerical value to be used for scoring the performer.

Still yet another object of the present invention is to provide a competition judging system that utilizes a call-in voting system to collect votes to be used in determining the winner of a match.

Another object of the present invention is to provide a competition judging system that utilizes an internet voting system to collect votes to be used in determining of the winner of a match.

Yet another object of the present invention is to provide a competition judging system that converts the votes received in both the call-in voting and internet voting systems into a percentage of total votes and converts the percentage into a numerical value used for scoring the performer.

An additional object of the present invention is to provide a competition judging system that weights the call-in votes, the internet votes, and the decibel level scoring equally with a weight smaller than the weight of the judges scores.

Yet another object of the present invention is to provide a competition judging system that is simple and easy to use.

Additional objects of the present invention will appear as the description proceeds.

The foregoing and other objects and advantages will appear from the description to follow. In the description, reference is made to the accompanying drawings, which form a part hereof, and in specific embodiments in which the invention may be practiced are shown by way of illustration. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 block diagram showing the competition judging system of the of the present invention;

FIG. 5 is an illustrative view of a decibel level conversion chart used to convert a decibel level into a numerical value to be used for scoring an act in the competition judging system of the present invention;

DESCRIPTION OF THE REFERENCED NUMERALS

Figure 1:
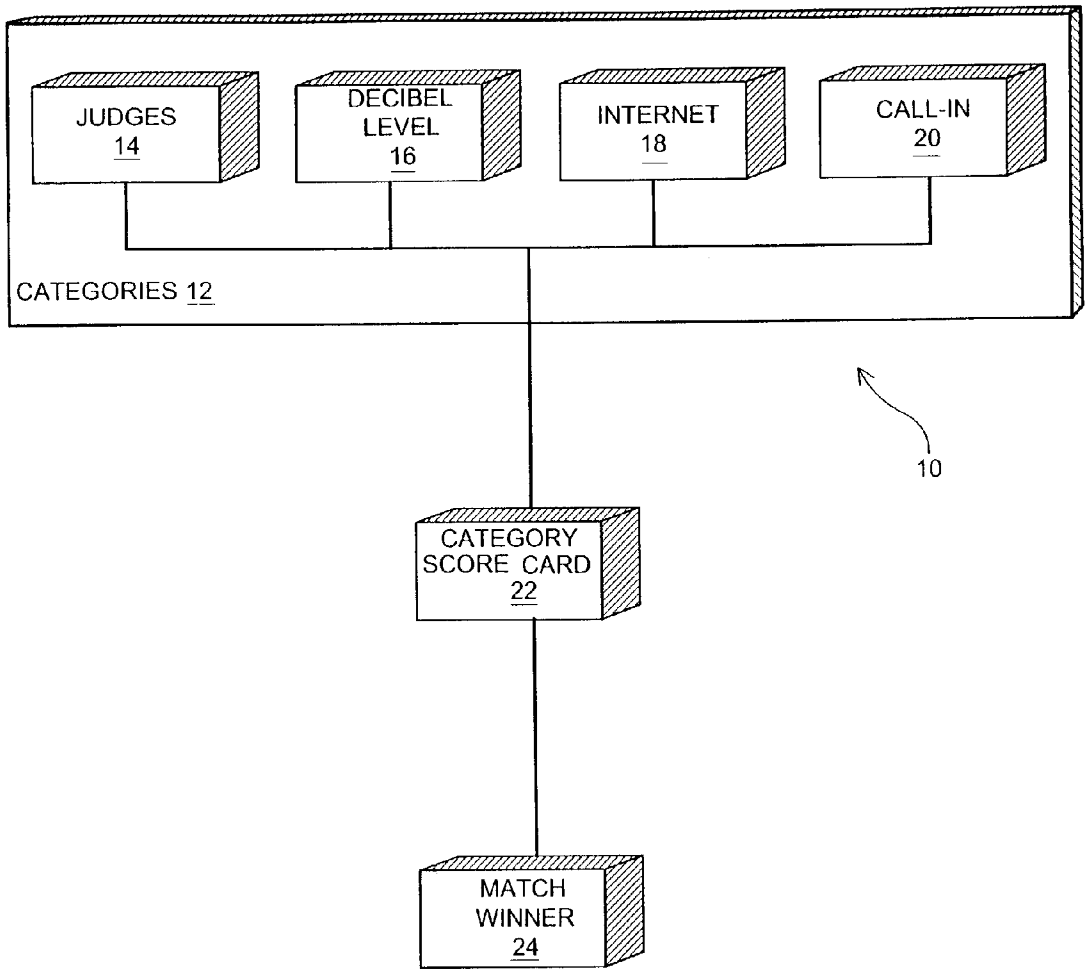

Turning now descriptively to the drawings, in which similar reference characters denote similar elements throughout the several views, the Figures illustrate the bidet adapter of the present invention. With regard to the reference numerals used, the following numbering is used throughout the various drawing figures.

10 competition judging system of the present invention
12 categories for judging acts
14 judges scores
15 decibel conversion chart
16 decibel level
17 equation determining total votes
18 Internet votes
19 percent of vote conversion chart
20 call-in votes
22 category scorecard
24 match winner
26 competition bracket
28 first round
30 second round
32 third round
34 Fourth round
36 competition winner
38 individual judges score card
40 first category
42 second category
44 third category
46 fourth category
50 total score for the artist
54 scoring value
56 weight
58 score
59 total score for artist
60 total of judges scores
62 numerical score based on decibel level
64 numerical score based on internet votes
66 numerical score based on call-in votes

DETAILED DESCRIPTION OF THE PREFERRED EMBODIMENT

The following discussion describes in detail one embodiment of the invention. This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 8 illustrate a competition judging system of the present invention indicated generally by the numeral 10.

Figure 2:
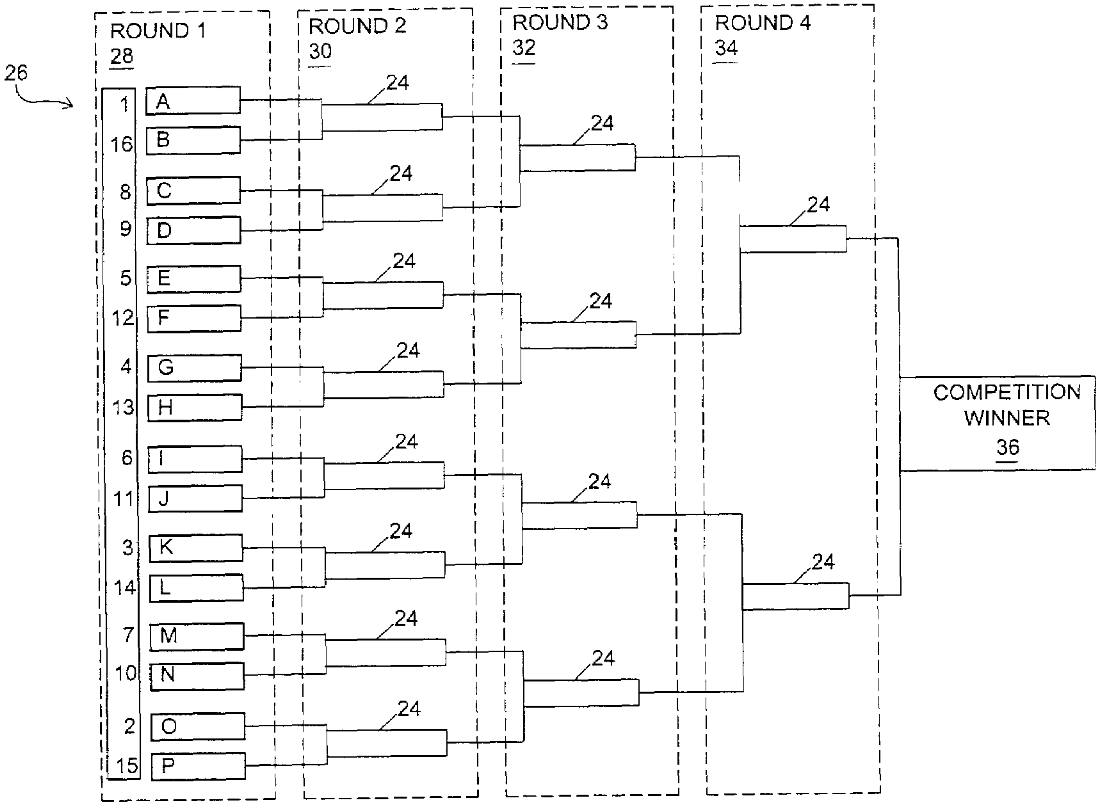
FIG. 2 is an illustrative view of the match list used in the competition judging system of the present invention to show which performers will compete against each other.

FIG. 1 is a block diagram showing the competition judging system 10 of the present invention. The competition judging system 10 of the present invention is a system that utilizes a plurality of judging categories 12 to provide a score for a performance by a performer which is recoded on an artist category scorecard 22. Thereafter, upon comparing the scores on a category scorecard 22 for a first performance with the category scorecard 22 of a second performance, the artist with the highest score is declared the winner of the match 24. This process is then repeated to determine match winners 24 of a plurality of matches leading to an elimination of performers until a winner of the overall competition is determined as shown in FIG. 2. Preferably this system is used with a competition bracket system 26 for determining the competition winner 36 as will be discussed hereinafter with specific reference to FIG. 2.

The competition judging system 10 of the present invention includes a plurality of categories 12. Preferably the categories 12 used in determining the winner of a match 24 are judges scores 14, decibel level of the audience 16, percent of votes received from the internet 18, and the percent of votes received from phone calls 20. These categories are described for purposes of example and any category that may be quantified into a numerical value may be included as one of the judging categories 12.

Figure 3:
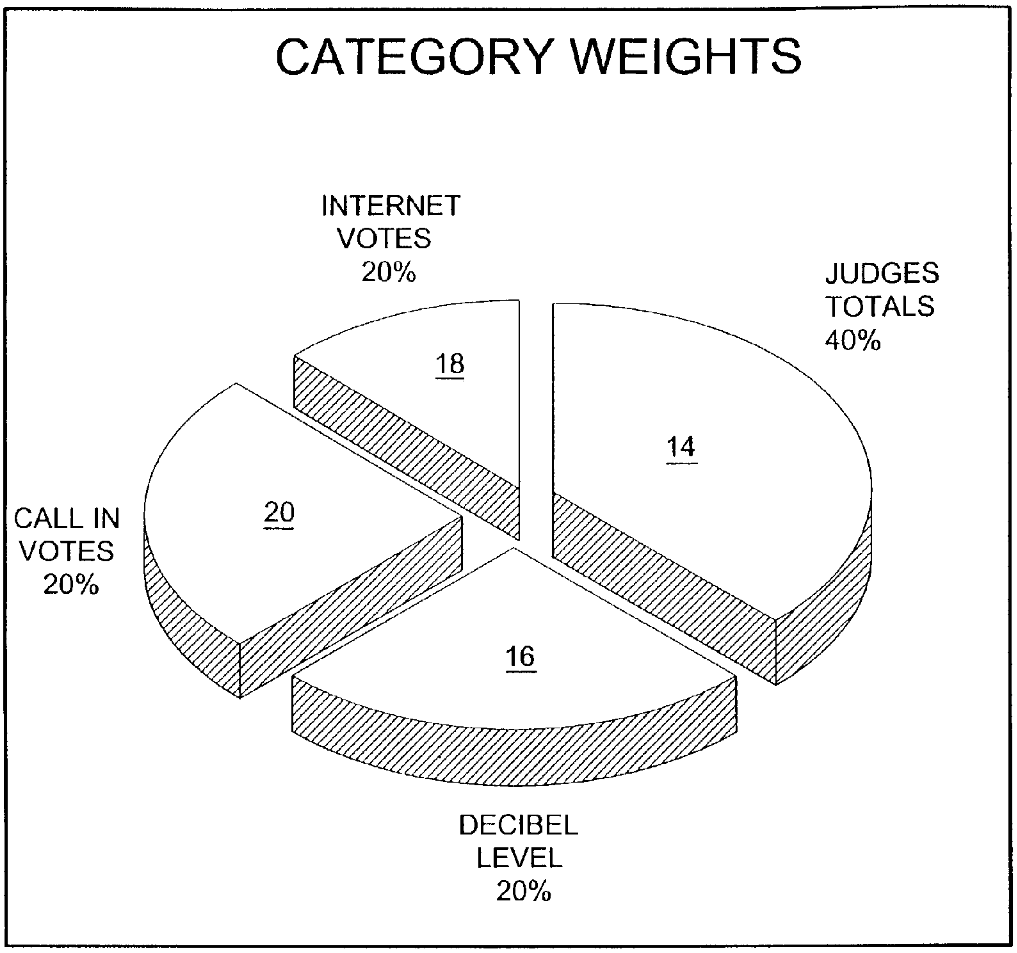
FIG. 3 is a pie graph showing the weight value assigned to each category used in determining a match winner using the competition judging system of the present invention.

Each respective one of the categories 12 is assigned a specific weight defining its importance in the determination of the ultimate score for the performance and the eventual winner of the match 24. Preferably, the category assigned the greatest weight is the judges scores 14 as the judges ideally are the most impartial in determining the overall performance of the artist. Additionally, the judges provide the most impartial of the scores used in the present example. As shown in FIG. 3, the judges scores count towards 40% of the total score used to determine the winner of the match 24. The 40% weight is discussed for purposes of example only. In this example the weight of the judges score is double the weight given to all other categories used in scoring a performance. The remaining categories 12 are all assigned a weight that are equal to one another thereby ensuring the fairness with which the match winner 24 is determined. Preferably, the highest weighted category should be appreciably more than the weight assigned to any one of the other categories 12.

A plurality of judges simultaneously view the artist performance and, based on specific performance aspects, give each artist a numerical score. The specific performance aspects used by each individual judge will be discussed hereinafter with specific reference to FIG. 4. Upon each individual judge rendering a total numerical score, the total scores for each of the judges are tallied to determine the numerical value of the score that represents the judges score 14 which is used as a portion of the total score in the competition judging system 10. Preferably there are 5 judges which judge the competition, however, any number of impartial judges may be used for judging in the competition judging system 10.

Figure 4:
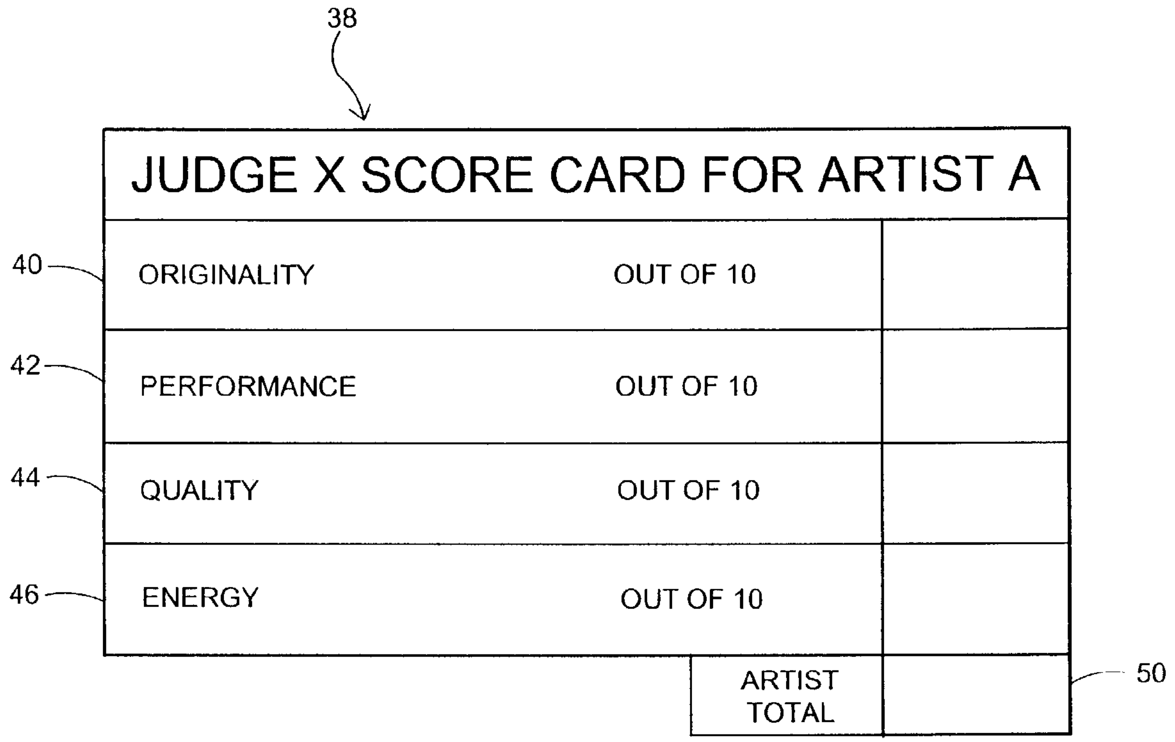
FIG. 4 is an illustrative view of a judges scorecard used to score an individual act in the competition judging system of the present invention.

The decibel level 16 score is determined by a plurality of decibel meters, as shown in FIG. 4, placed around the venue where the competition is taking place. The decibel meters are used to determine the amount of noise made by the viewing crowd for a specific artist. This value is preferably determined after the artist finishes his/her performance thereby giving the audience an opportunity to cheer. The decibel meters measure this volume in decibels (dB). The dB value is then converted to a numerical score using a conversion chart which will be discussed hereinafter with specific reference to FIG. 5. Each artist receives a score based on the dB level and that score is used as the value for the decibel level of the crowd category 16. The numerical score is then given the weight accorded thereto. Preferably, the decibel level of the crowd 16 counts 20% towards the total score in determining the match winner 24. The decibel level of the crowd 16 counting 20% is described for purposes of example only and this category may have a weight equal to or less than this percentage.

The percent of votes received from the internet 18 and the percent of the votes received from phone calls 20 will be discussed together as the only difference between the two categories is the method by which the vote is cast. These categories are designed to be used in a competition that is broadcast live, such as on pay-per view TV, network TV, or cable TV. Upon the competition being broadcast live, viewers from many different areas may take part in viewing the competition and determining the individual match winner 24. After the performance has been completed a viewer may dial a specific phone number or log onto a specific web site to cast their votes. In order for a numerical score to be determined, both artists set to perform in the specific match must perform. Thereafter, a percent of total votes cast is determined for each of the artists who performed in that match. The determination of this value will be discussed hereinafter with specific reference to FIG. 6. Upon determining a percent of the total votes cast for each one of the internet votes 18 and the call in votes 20, the percent value is converted to a numerical score which is then assigned to the respective category and placed on the category scorecard 22 for determining the match winner 24. Each categories numerical score is multiplied by its predetermined weight value for use in determining the total score for each performer.

Upon completion of the two artists performances, scores are input on respective category scorecards 22 and a total score is determined. Preferably, the scores for each of the respective categories 12 are determined on a ten scale. However, the ten scale is described herein for purposes of example only and any numerical value scale such as a hundred scale or a thousand scale, may be used by the competition judging system 10 of the present invention. The total scores for each artist are then compared and the artist having the higher score moves on to face another match-up with another artist.

FIG. 2 is an illustrative view of a matchup scorecard for use with the competition judging system showing the match-ups for contestants and winners of each round of the competition. At the outset of the competition a set number of acts are designated to compete in the competition. Upon determining the number of acts to participate a competition bracket 26 is formed. The competition bracket 26 is shown in FIG. 2 to include 16 acts designated by the letters A–P. Having 16 acts is described for purposes of example only and any two or more acts may be gathered together to compete against one another. Having 16 acts as shown herein requires the competition to have four rounds to determine an ultimate competition winner 36. The match-ups and number of rounds is dependent upon the number of contestants. If the number of contestants is not a multiple of two, certain contestants will need to compete in a play-in round while other contestants receive a "bye" or pass for the play-in round.

The first round 28 includes 8 matches, each match pitting 2 performers against one another. Prior to the beginning of the competition, each of the 16 artists participating in the competition are assigned a value and that value is used to place each of the respective artists in their appropriate position in the competition bracket 26. This is similar to a seeding system which is known and used in many forms of competitions such that artists would be seeded 1–16. Preferably, the number 1 seed is placed in position A and the number 16 seed is placed in position B. The number 2 seed is placed in position P and the number 15 seed is placed in position O. The number 3 seed is placed in position K and is pitted against the number 14 seed which is located in position L. The number 4 seed, located in position G, is pitted against the number 13 seed which is placed in position H. The number 5 seed is occupies position E and performs against the number 12 seed which occupies position F. The number 6 seed is located in position I and is pitted against the number 11 seed located in position J. The 7 seed is located in position M and is pitted against the number 10 seed located in position N, and finally the number 8 seed is positioned in position C and is pitted against the number 9 seed located in position D.

After each artist that is scheduled to participate in their respective match performs, a total score for each of the artist is determined and compared thereby determining a match winner 24. The match winner for each of the 8 matches set to take place in the first round 28 move on and compete against another respective match winner 24 in a second round 30 according to the path set by the competition bracket 26. The second round 30 includes four matches. The winners of the matches in the second round 30 go on to face each other in a third round 32. The third round 32 includes two matches. The winners of each of the matches in the third round go on to compete against each other in a fourth and final round 34. The fourth round only includes one match and is the match which will determine the competition winner 36.

Each match that takes place throughout the competition is judged using the competition judging system of the present invention. The competition judging system 10 of the present invention includes a plurality of categories 12. Preferably the categories 12 used in determining the winner of a match 24 are judges scores 14, decibel level of the audience 16, percent of votes received from the internet 18, and the percent of votes received from phone calls 20. These categories are described for purposes of example and any category that may be quantified into a numerical value may be included as one of the judging categories 12.

Each respective one of the categories 12 is assigned a specific weight defining its importance in the determination of the ultimate score for the performance and the eventual winner of the match 24. Preferably, the category assigned the greatest weight is the judges scores 14 as the judges ideally are the most impartial in determining the overall performance of the artist. Additionally, the judges provide the most impartial of the scores used in the present example. As shown in FIG. 3, the judges scores count towards 40% of the total score used to determine the winner of the match 24. The 40% weight is discussed for purposes of example only. In this example the weight of the judges score is double the weight given to all other categories used in scoring a performance. The remaining categories 12 are all assigned a weight that are equal to one another thereby ensuring the fairness with which the match winner 24 is determined. Preferably, the highest weighted category should be appreciably more than the weight assigned to any one of the other categories 12.

The plurality of judges simultaneously view the artist performance and, based on specific performance aspects, give each artist a numerical score. The specific performance aspects used by each individual judge will be discussed hereinafter with specific reference to FIG. 4. Upon each individual judge rendering a total numerical score, the total scores for each of the judges are tallied to determine the numerical value of the score that represents the judges score 14 which is used as a portion of the total score in the competition judging system 10. Preferably there are 5 judges which judge the competition, however, any number of impartial judges may be used for judging in the competition judging system 10.

The decibel level 16 score is determined by a plurality of decibel meters, as shown in FIG. 4, placed around the venue where the competition is taking place. The decibel meters are used to determine the amount of noise made by the viewing crowd for a specific artist. This value is preferably determined after the artist finishes his/her performance thereby giving the audience an opportunity to cheer. The decibel meters measure this volume in decibels (dB). The dB value is then converted to a numerical score using a conversion chart which will be discussed hereinafter with specific reference to FIG. 5. Each artist receives a score based on the dB level and that score is used as the value for the decibel level of the crowd category 16. The numerical score is then given the weight accorded thereto. Preferably, the decibel level of the crowd 16 counts 20% towards the total score in determining the match winner 24. The decibel level of the crowd 16 counting 20% is described for purposes of example only and this category may have a weight equal to or less than this percentage.

The percent of votes received from the internet 18 and the percent of the votes received from phone calls 20 will be discussed together as the only difference between the two categories is the method by which the vote is cast. These categories are designed to be used in a competition that is broadcast live, such as on pay-per view TV, network TV, or cable TV. Upon the competition being broadcast live, viewers from many different areas may take part in viewing the competition and determining the individual match winner 24. After the performance has been completed a viewer may dial a specific phone number or log onto a specific web site to cast their votes. In order for a numerical score to be determined, both artists set to perform in the specific match must perform. Thereafter, a percent of total votes cast is determined for each of the artists who performed in that match. The determination of this value will be discussed hereinafter with specific reference to FIG. 6. Upon determining a percent of the total votes cast for each one of the internet votes 18 and the call in votes 20, the percent value is converted to a numerical score which is then assigned to the respective category and placed on the category scorecard 22 for determining the match winner 24. Each categories numerical score is multiplied by its predetermined weight value for use in determining the total score for each performer.

Upon completion of the two artists performances, scores are input on respective category scorecards 22 and a total score is determined. Preferably, the scores for each of the respective categories 12 are determined on a ten scale. However, the ten scale is described herein for purposes of example only and any numerical value scale such as a hundred scale or a thousand scale, may be used by the competition judging system 10 of the present invention. The total scores for each artist are then compared and the artist having the higher score moves on to face another match-up with another artist.

FIG. 3 is a pie graph showing the weight value assigned to each category used in determining a match winner using the competition judging system of the present invention. The score for each artist is determined using the plurality of categories as discussed above with specific reference to FIG. 1. Each of the categories 12 are aggregated and used to form the total score. As shown in FIG. 3, the example used in this application uses four categories to determine the total score. The amount that each respective category counts towards the total score is shown in pie graph form. The judges scoring 14 is shown to count 40% towards the total score. The judges scoring 14 in this example is weighted double the weight value assigned to each of the remainder of categories 12. Having a competition judging system 10 that so heavily weights the judges scoring 14 allows for a more fair an impartial system so that the physical and emotional pressures on the audience do not bias the outcome of the competition. The physical factors which may negatively affect the outcome of the competition include at least one of location of the competition venue, geographical affiliation of the artist, unbalanced number of fans for one specific artist, and general dislike for an artist. These factors could cause an unjust result not based on the performance of the artist. The other categories 12 are weighted equally as they are determined by the people watching the performances both live and via broadcast. Each of the decibel level 16, the percent of internet votes 18, and percent of phone votes 20 in the present example count 20% toward the total score for individual artist. Upon determining a numerical value for the score, the judges scores 14 (40%), the decibel level (20%), the percent of internet votes (20%), and the percent of phone votes (20%) are added together to determine the total score. After both artists have performed, the total scores for each are compared and the artist having the higher score moves on to compete in the subsequent round.

FIG. 4 is an illustrative view of a judges scorecard of the competition judging system of the present invention used to score an individual act. The judges score category 14 is determined using a judges scorecard 38. Preferably, there are a plurality of judges that comprise a judging panel and the scores from each of the judges are compiled together in order to obtain the value for use in the judges score category 14. Each respective judge on the judging panel has a scorecard 38. Each judge then judges the performance of the artist based on a predetermined number of performance categories. As shown in FIG. 4, the judges use a first performance category 40, a second performance category 42, a third performance category 44, and a fourth performance category 46. The competition judging system 10 having four performance categories is discussed for purposes of example only, and the system 10 may include any number of performance categories. The first performance category 40 as shown in FIG. 4 is based on the originality of the performance. The second performance category 42 is based on the overall opinion of the judge of the performance. The third performance category 44 is based on the quality of the performance in relation to other performers. The fourth performance category is based on the energy level exhibited by the performer during the performance. These performance categories are described for purposes of example only and any other performance indicators can be used as a benchmark to score the individual artist. As shown, the judge rates each performance on a scale of ten being the maximum and 0 being the least. Upon determining a numerical value for each respective performance category, the numerical values are averaged together to come up with an artist total 50. After each act has performed, each judge submits the judges scorecard 38, the value in each of the artist total box 50 on each respective one of the judges scorecard 38 is averaged together to come up with an average total score which is placed in the judges score category 14 on the category scorecard 22. As discussed above with respect to FIG. 3, the judges scores 14 are worth 40% of the total score.

FIG. 5 is an illustrative view of a decibel level conversion chart of the competition judging system used to convert a decibel level into a numerical value to be used for scoring an act. The decibel level 16 of the crowd is determined using a plurality of decibel meters strategically placed around the venue where the competition is taking place. The decibel level is determined after each performer has finished their performance. The noise generated by the crowd is indicative of voting for that specific artist and a decibel value (dB) is determined. Upon determining a decibel value, the decibel value is converted to a numerical value using a decibel conversion chart 15. This conversion can be done manually or by a computer. As shown in FIG. 5, the numerical value is based on a scale of ten where ten is the maximum value and 0 is the lowest value. In this scale, the highest numerical value of "10" is assigned to a dB value of 120 dB. The numerical values downwardly increment at every 2 dB between 120 dB and 102 dB. This numerical conversion from dB value to numerical value is described for purposes of example only. Upon converting the dB value to a numerical value for a specific artist, the numerical value is entered on the category scorecard 22 and counts 20% towards the total score for that artist.

Figure 6:
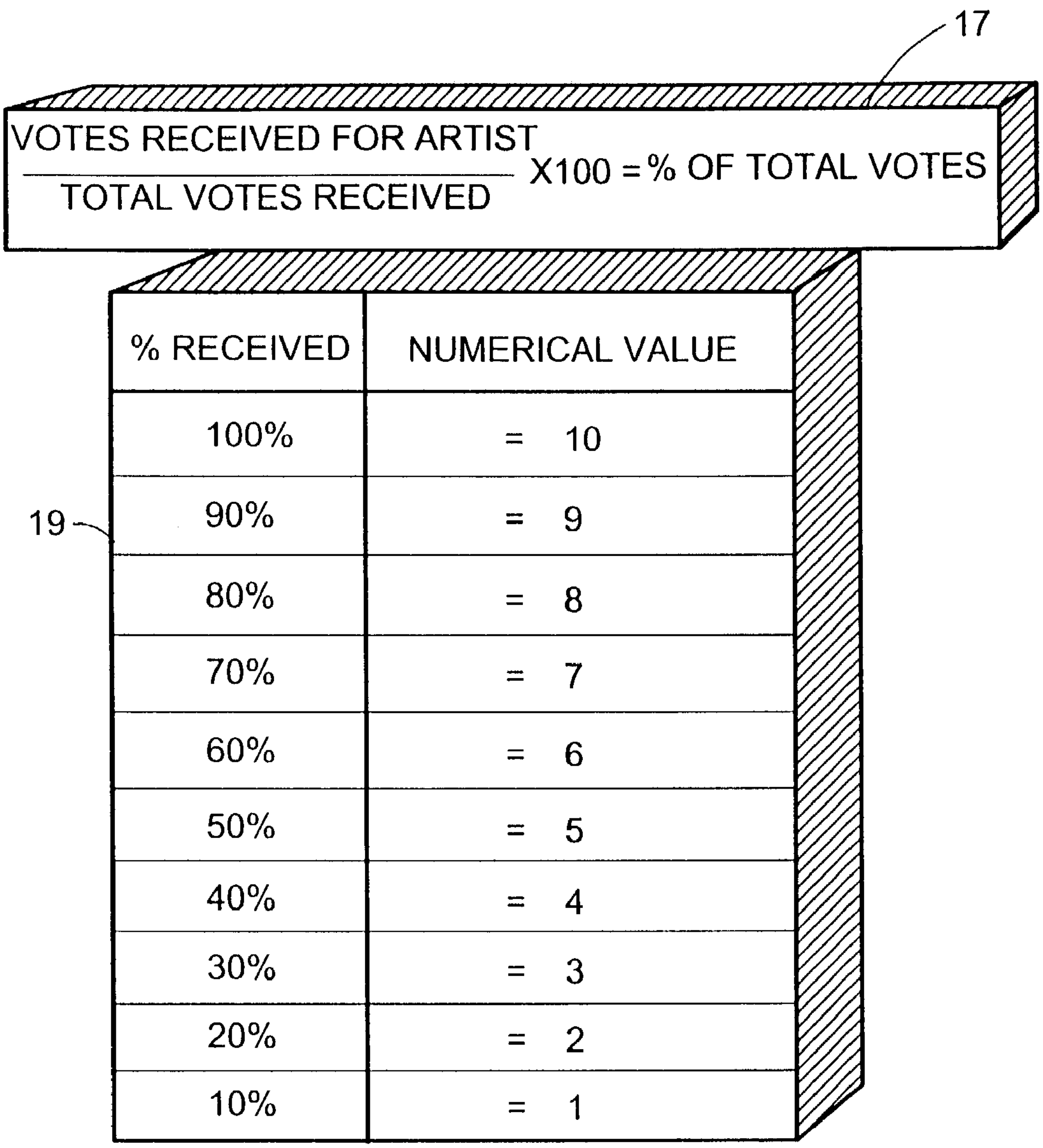
FIG. 6 is an illustrative view of a conversion equation and conversion chart used to calculate a numerical score from votes received from voters in the competition judging system.

FIG. 6 is an illustrative view of a conversion equation and conversion chart of the competition judging system used in calculating a numerical score from votes received from voters. The numerical scoring value associated with both the internet votes 18 and the phone votes 20 are generated using a conversion equation 17 and a conversion chart 19. After both of the artists performs, an individual phone line or internet site is open to allow viewers to vote for the artist they would like to see win the match. The voting lines and internet site remain open for a specified amount of time thereby allowing a finite number of votes to be used in calculating the score. After the voting lines and internet site close, the conversion equation is used to generate a percent of total votes that each individual artist has received. This equation is shown in FIG. 6. This equation is used to calculate a percentage by dividing the total number of votes for the artist by the total number of votes received. That number is multiplied by 100 in order to obtain the percent of total votes for that artist. Thereafter, the percent obtained from equation 17 is converted into a numerical value using the conversion chart 19. The conversion chart 19 incrementally assigns a numerical value from 10–1 in descending order, whereby an artist receiving 100% of the total votes has a numerical value of 10 and a person receiving 10% of the total votes has a numerical value of 1. The numerical value is stepped down at every 10% mark between 100% and 10% as shown in FIG. 6. The numerical values associated with the percent of total votes is described for purposes of example only. Calculation of the percent of total votes using equation 17 and conversion of that percentage to a numerical value can be done mechanically or by use of a computer. Upon conversion of the percent of total votes into a numerical value using the conversion chart 19, the numerical value for each of the internet vote category 18 and the call-in vote category 20 is entered on the respective category scorecard 22 for each artist. Each of the internet vote category 18 and the call in vote category 20 counts 20% toward the total score for the artist.

Figure 7:
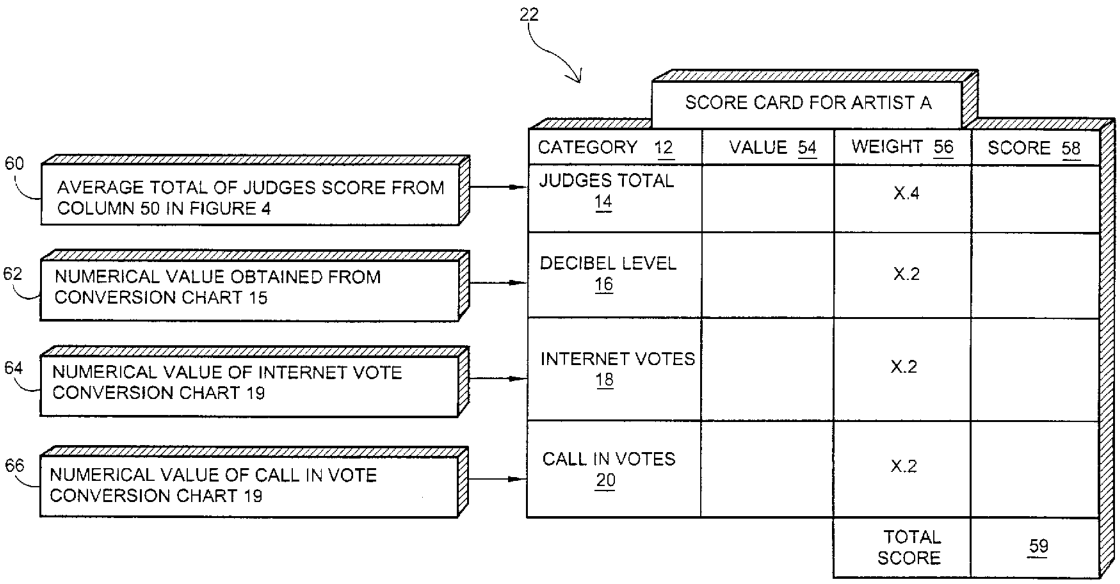
FIG. 7 is an illustrative view of scorecard used by judges for combining and totaling the scores received in each category for determining a total score for an act in the competition judging system.

FIG. 7 is an illustrative view of the category scorecard used by the competition judging system for combining and totaling the scores received in each category for determining a total score for an act. The scoring values obtained from the categories 12 are entered on the category scorecard 22. The category scorecard 22 includes a column listing the categories 12, a column containing a scoring value for each category 54, a column containing the weight associated with that category 56 and a column having the final score 58. The final scores 58 for each category are added up to obtain the total score 59. The artist of each match having the highest total score 59 is the match winner 24 as shown in FIG. 1.

The average total score from the judging panel 60 is entered into the value column 54 adjacent the judges score category 14 on the category scorecard 22. The numerical value 62 obtained from decibel conversion chart 15 is placed in the value column 54 adjacent the decibel level category 16 on the category scorecard 22. The numerical value 64 obtained from the voting conversion chart 19 for the internet votes is placed in the value column 54 adjacent the internet votes category 18 on the category scorecard 22. The numerical value 66 obtained from the conversion chart 19 for the call-in votes is placed in the value column 54 adjacent the call-in votes category 20. Each respective value contained in the value column 54 is then multiplied by the appropriate weighting contained in column 56 in order to place the numerical values contained in column 54 in the proper percentage for calculation of the total score 59. Upon placing the numbers in the proper percentages, the total score 59 is then calculated by adding the weighted values 58 contained in each row of the category scorecard 22. The artist having the highest total score is the match winner 24.

Figure 8:
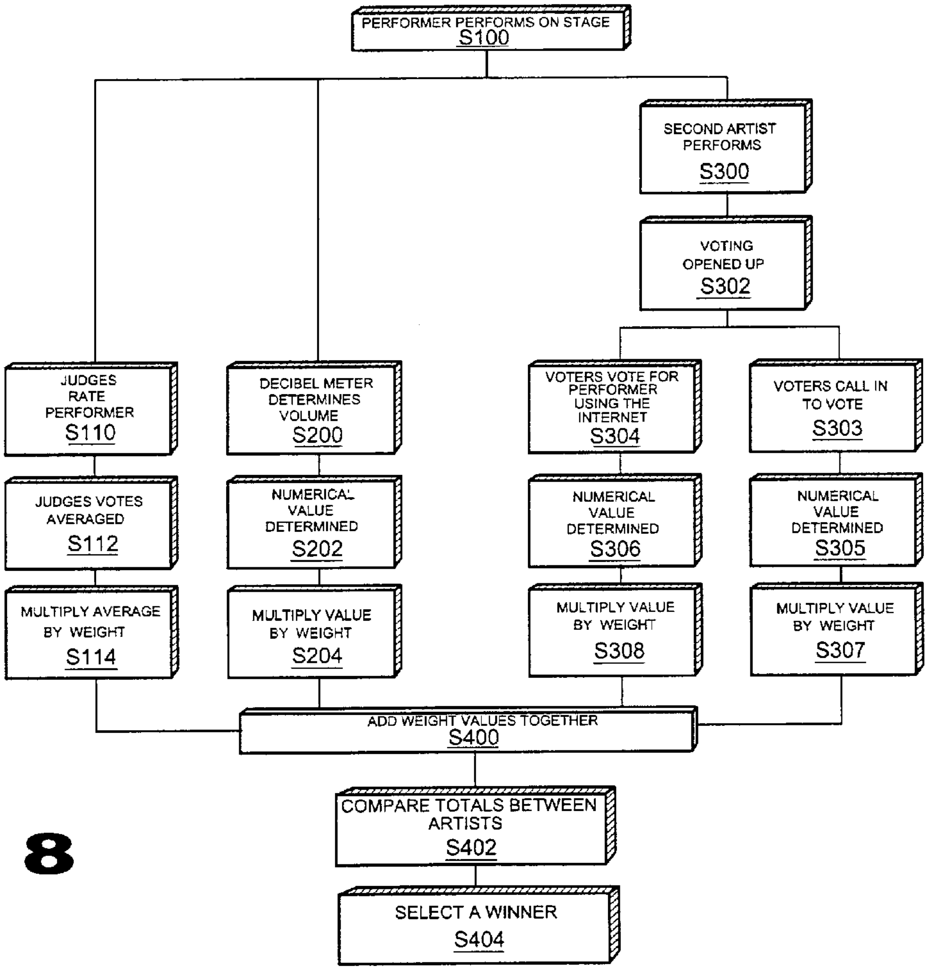
FIG. 8 is a flow chart showing the competition judging system of the present invention in use during a competition.

FIG. 8 is a flow chart detailing showing the competition judging system in use during a competition. The competition begins when the each respective performer that is participating in a match performs as shown in step S100. After the performance of both performers, the competition judging system judges each respective performer. The judges rate each respective performer as shown in step S110. Thereafter the judges votes are taken and averaged together as shown in step S1112. Upon determining an averaged score, the average score is multiplied by the weight associated with the judges scores as in step S114. Alternatively, each performer may be judged separately after their respective performances.

Also after the performance as in step S1100, a decibel meter determines a dB value generated by the crowd as shown in step S200. The dB value obtained in step S200 is then converted into a numerical value as shown in step S202. The numerical value of the decibel level is then multiplied by the weight associated with the decibel level as shown in step S204.

In order for the scores based on the internet voting and phone voting to be calculated, the second artist must perform as stated in step S300. After the second artist performs in step S300, the voting is opened up to the public as shown in step S302. Now the internet votes and the phone votes can be tallied. The voters then vote for the artist they liked better using the internet as in step S304. A numerical value associated with the internet vote is then determined as in step S306. The numerical value is determined as discussed above with specific reference to FIG. 6. The numerical value associated with the internet vote is then multiplied by the by the weight associated with the internet vote category as shown in step S308. Alternatively, the internet and call in voting for each performer may be held separately whereby a time limit is placed on receiving internet and call in votes after each performance.

Voters can choose to call in to cast their votes for their favorite artists as shown in step S303. A numerical value for the votes received via telephone is then determined as indicated in step S305. The numerical value is determined as discussed above with specific reference to FIG. 6. The numerical value associated with the phone voting is then multiplied by the weight associated with the phone vote category as shown in step S307.

Upon the numerical values for the four categories being multiplied by the weight associated with each respective category as is discussed above in steps S114, S204, S308, and S307, those values are added together as indicated in step S400 in order to obtain a total score. The total score of each artist are then compared as shown in step S402. A winner is chosen in step S404 by selecting the artist that has the highest total score as calculated in step S400. The artist having the highest score is the match winner and can then face a winner of a different match until a competition winner is chosen.

The competition judging system 10 of the present invention is preferably used in a competition between Hip-Hop acts that is broadcast live on TV as well as attended by fans. This system is specifically useful for Hip-Hop competitions so as to prevent the artists from the immediate geographic area of the venue where the competition is being held from unfairly choosing the winners of each match based on local loyalty. The system allows viewers from all over to have input in choosing a competition winner.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A method for judging a competition of musical performers comprising the steps of:

a) determining a competition seeding for competitors within the competition;

b) entering the competitors on a match play board based upon the seeding to determine individual matches for the competitors;

c) having a pair of competitors in the match each perform an individual act before a live audience and broadcast live;

d) using a panel of judges to judge the performance of each performer based upon a plurality of individual performance criteria to determine criteria scores for each competitor;

e) obtaining scores from noise levels measured in decibels of the live audience, and responses over the internet and call-ins;

f) computing total scores for each competitor based upon the determined criteria scores of the panel of judges and the scores obtained from noise levels of the live audience, and votes received over the internet and from call-ins;

g) determining a winner of the match based upon which competitor received a highest total score;

h) entering the winner of the match into a next round of the competition; and i) repeating steps a)–h) until only one competitor remains in the competition.

2. The method as recited in claim 1, wherein each of the plurality of individual performance criteria is given a weighted value of importance in determining the score for each competitor.

3. The method as recited in claim 2 wherein the musical performance are Hip-Hop.

4. The method as recited in claim 2, wherein the judging by individual judges includes scores based upon at least one of originality of the performance, quality of the performance, energy of the performer and overall performance quality.

5. The method system as recited in claim 4, wherein the noise level of the audience is measured by at least one decimeter positioned within an area surrounding the audience viewing the performance.

6. The method as recited in claim 5, wherein the at least one decimeter measures the noise level of the audience in decibels.

7. The method system as recited in claim 6, wherein the decibels measurable by the decimeter are separated into ranges, each range of decibels being equated with a numerical score.

8. The method as recited in claim 7, wherein a score produced by said panel of judges is given greater weight than scores obtained from the noise level of the live audience, the internet, and call-ins in computing a total score for each competitor the scores obtained from the noise level of the audience, the internet and call-ins being given equal weight.

9. The method as recited in claim 8 wherein the score produced by said panel judges is given double the weight of scores obtained from noise level of the live audience, the internet, and call-ins.

10. The method system as recited in claim 9, wherein each criteria score is adjusted to a scale between 0–10.

* * * * *